United States Patent
Dietz

(10) Patent No.: US 9,773,385 B2
(45) Date of Patent: Sep. 26, 2017

(54) CARD READING DEVICE AND SO-EQUIPPED SELF-SERVICE TERMINAL AND METHOD FOR MONITORING THE SAME

(71) Applicant: Wincor Nixdorf International GmbH, Paderborn (DE)

(72) Inventor: Oliver Dietz, Borchen (DE)

(73) Assignee: Wincor Nixdorf International GmbH (DE)

(*) Notice: Subject to any disclaimer, the term of this patent is extended or adjusted under 35 U.S.C. 154(b) by 0 days.

(21) Appl. No.: 15/258,332

(22) Filed: Sep. 7, 2016

(65) Prior Publication Data
US 2017/0069176 A1 Mar. 9, 2017

(30) Foreign Application Priority Data
Sep. 9, 2015 (DE) .................. 10 2015 115 194

(51) Int. Cl.
| | |
|---|---|
| G06Q 40/00 | (2012.01) |
| G07F 19/00 | (2006.01) |
| G06Q 20/10 | (2012.01) |
| G06Q 20/34 | (2012.01) |
| G06K 7/08 | (2006.01) |
| G07F 7/08 | (2006.01) |

(52) U.S. Cl.
CPC .......... *G07F 19/204* (2013.01); *G06K 7/084* (2013.01); *G06Q 20/1085* (2013.01); *G06Q 20/34* (2013.01); *G07F 7/0873* (2013.01); *G07F 19/2055* (2013.01)

(58) Field of Classification Search
USPC .................................................. 235/379, 449
See application file for complete search history.

(56) References Cited

U.S. PATENT DOCUMENTS

| | | | | |
|---|---|---|---|---|
| 5,796,083 A * | 8/1998 | Kenneth | ............... | G06K 7/0013 235/380 |
| 6,467,689 B1 * | 10/2002 | Kaji | ....................... | G06K 7/084 235/475 |
| 6,491,216 B1 * | 12/2002 | May | .................... | G06K 13/0875 235/375 |
| 2006/0054700 A1 * | 3/2006 | May | .................... | G07F 19/2055 235/449 |
| 2011/0240738 A1 * | 10/2011 | Mizawa | ............. | G06K 13/0887 235/449 |

* cited by examiner

*Primary Examiner* — Ahshik Kim
(74) *Attorney, Agent, or Firm* — Gerald E. Hespos; Michael J. Porco; Matthew T. Hespos

(57) ABSTRACT

A card reading device (20) for a self-service terminal has an intake compartment (13) for a card (11) containing data to be read. The intake compartment (13) has at least one linearly extending sensor arrangement (6A, 6B) and an evaluator device (4) connected thereto to protect the card reading device (20) against manipulation attempts. The evaluator device (4) checks at least one spatial dimension (l,b) of the card via the sensor arrangement (6A, 6B), namely a dimension in a first direction (X) or a second direction (Y) in relation to the card (11) retracted into the intake compartment (13). Thus, it can be determined effectively whether a retracted card is a genuine card or if a manipulation is present that targets the inside of the card reading device.

12 Claims, 12 Drawing Sheets

CARD READING DEVICE AND SO-EQUIPPED SELF-SERVICE TERMINAL AND METHOD FOR MONITORING THE SAME

The present invention relates to a card reading device for a self-service terminal and in particular for an automated teller machine (ATM) according to the preamble of claim 1. Furthermore the invention relates to a self-service terminal equipped with the same and to a method for monitoring the same according to the preambles of the independent claims.

BACKGROUND OF THE INVENTION

Very often, the card reading devices in self-service terminals are a primary target for manipulation-attempts and skimming-attacks. This is because a user, attempting to use the self-service terminal that in particular can be an ATM, requires a banking-card that usually comprises a chip and/or a magnet strip on which card data including the personal customer and account access data are stored. Unfortunately, self-service terminals are becoming subject of manipulation by third persons who try to obtain these data in a criminal manner. Amongst other techniques they try to insert a spy-device into the card-slot of the card reading device in an inconspicuous manner, wherein this spy-device is capable to directly read out the magnetic strip or to attach to an internal interface (such as an USB-interface) of the card reading-device. This shall finally realize a readout of the banking-card data in order to make an illegal copy of the card. Moreover, skimming-attempts are known in which an alien card reader is attached to the card reading device as an unobtrusive superstructure, capable to e.g. send the read out card data via a radio transmission. If the frausdster is also capable to obtain the personal identification number (so-called PIN) of the card he/she can easily withdraw money from accompanying account. Moreover, skimming-attacks are known in which an internal interface directly simulates/pretends a card reading process and thus manipulates the software control of the self-service terminal or ATM.

Moreover, direct trapping of a card is another known attack scenario. Within this trapping scenario a superstructure is mounted in front of the card reading device to steal the card. This superstructure comprises a "Lebanese loop" extending towards the card reading device and being mounted directly behind the card insert slot and having a flap which only allows one way insertion of the card. Once a customer inserts a card, said card is captured and trapped by the Lebanese loop; the flap blocks the card from being ejected. By this behaviour of the apparatus the user believes his/her card that a (rightfully) withheld or retract of the card occurs. Then he/she consequently leaves the self-service terminal. In the following the frauder or deceiver takes the card together with the superstructure.

In order to detect card trapping, the process of card-retract has been modified in the prior art. The card is first retracted, then driven out and then retracted again by the card reading device. If this procedure is not possible in a perfect manner, i.e. ejecting a card is not possible, it can be assumed that a card theft has been attempted. However, this security procedure/approach increases the transaction time at the device.

It is also known to counteract such manipulation attempts of self-service terminals be using sensors. The German patent application DE 196 05 102 A1 discloses to use one or more infrared sensors for safeguard the self-service terminal, wherein the signals of these sensors are processed by an evaluator device to detect superstructures.

In the German patent application DE 10 2008 012 231 A1 a protection device is proposed that comprises a protection-shield-generator and a connected induction coil to create an electromagnetic protection shield that covers the electromagnetic fields which are created during (illegally) reading-out the card and therefore influence/interfere the functionality of the alien card reading device (spy-device) such that it fails to deliver useful data. To avoid that the deceiver may detect this protection device, the electromagnetic protection-field is generated with a special protection signal simulating a standard card-reading signal that only contains unuseful psuedo-data. However, this protection device can not be used to avoid or impede such skimming-attempts that are directly targeted to the interior of the card reading device and e.g. receive signals from an inserted spy-device or even from an interior data interface.

In this context there is also to mention the German patent application DE 10 2009 019 708 A1 which discloses to create a stray or noise field via permanent magnets that are moved by piezo-elements, in order to generate an induced magnetic alternating field which effectively interferes the skimming card reading device while reading-out the data. Furthermore the European patent application EP 1 394 728 A1 is cited in which supersonic sensors are disclosed to detect an attached superstructure to the self-service terminal. But also these solutions are not capable to avoid or impede skimming-attempts that occur in the interior of the card reading device.

In the US patent application US 2006/0249574 A1 the misuse of a card is mentioned, but not a manipulation within the interior of the card reading device as such. Herein, it is proposed to equip the card with a microcontroller and an encryption function (cf. FIG. 2). For the power supply of the microcontroller there are photovoltaic or piezo-electric components proposed. However, monitoring of or defense against skimming-attempts via sensors is not described.

Furthermore, it is well known to protect devices that are commonly used to store money or valuables, in particular vaults or bank-vaults with sensors. For instance the German patent application DE 2 318 478 A1 discloses a monitoring system for a strongroom, in which supersonic-sensors are used to determine motions therein via the Doppler-effect. Another disclosure that is relying on an ultrasonic alarm mechanism is disclosed in the German patent application DE 2 617 467 A1.

Accordingly, conventional self-service terminals comprise a card reading device into which a card can be inserted that contains data to be read, wherein the self-service terminal comprises at least one sensor for defense against manipulation attempts and an evaluator device. However, these solutions are not capable for protection against manipulations attempts that aim on the interior of the card reading device.

Therefore, it is the object of the present invention to further develop a card reading device as mentioned before in order to be capable to protect against manipulation attempts and skimming-attacks at the interior of the card reading device or at least make such attempts more difficult. Also a self-service terminal being equipped with such a card reading device and a method to monitor such a self-service terminal is provided.

SUMMARY OF THE INVENTION

The preceding object is achieved by a card reading device comprising the features of claim 1 as well as by a self-service terminal and a method having the features of the according juxtaposed claims.

Accordingly a card reading device is presented wherein at least one sensor system is attached in the card reading device and comprises at least one linearly extending sensor arrangement, wherein the evaluator device verifies at least one spatial dimension of the card via at least one sensor system. Hence, a card reading device is presented, in which a sensor system is directly arranged inside the card reading device but is particularly arranged in or at the intake compartment for the cards to be read, wherein the card reading device verifies at least one spatial dimension, in particular the length or width, via the sensor system. The sensor system can be e.g. an opto-electric sensor system.

The present invention also provides a self-service terminal that in particular can be an ATM, comprising said card reading device. Furthermore, a method for monitoring the self-service terminal or the ATM via the sensor system and the evaluator device is presented, wherein the sensor system is arranged inside the card reading device and comprises at least one linearly extending sensor arrangement that particularly is arranged in the intake compartment and wherein at least one spatial dimension of the card is verified/checked via the evaluator device.

Consequently, a sensor system is installed inside the card reading device to compare the spatial dimensions of an inserted object to that of a conventional card, such that it can be effectively determined, whether a conventional card is present in the card reading device or an alienated object, e.g. a spy-device with similar dimensions as compared to the card.

Preferred embodiments can be found in the dependent claims.

In a preferred embodiment the sensor system is arranged as a sensor arrangement comprising a plurality of linearly arranged sensor elements, wherein the sensor arrangement extends in a vertical or a horizontal direction relative to the inserted card. Herein, a first sensor arrangement can detect the length of the card as a first spatial dimension and/or a second sensor arrangement can detect the width of the card as a second spatial dimension.

In another preferred embodiment only one sensor arrangement is present to detect the width and length. The second sensor arrangement can for instance be arranged to not only detect the width of the card but also the length of the card by determining the beginning and the end of the card and by operating the evaluating device to measure the insertion time and thus to determine the length of the card according to a constant insertion velocity.

Therefore, the sensor system installed in the card reading device is particularly a sensor arrangement with a plurality of sensor elements that are linearly arranged and extend in a horizontal or a vertical direction of the card that has been inserted into the intake compartment. Herein, the first sensor arrangement detects the length of the card as the first spatial dimension and/or the second sensor arrangement detects the width of the card as the second spatial dimension. Moreover, an additional sensor or sensor system can be arranged within the card reading device that detects the height of the card as a third dimension. Preferably the sensor elements of the at least one sensor arrangement and/or the additional sensor system are embodied as opto-electric sensor elements. However, other sensor types can be employed as an alternative to detect the spatial dimensions of the card.

Moreover, a further additional sensor arrangement, in particular an opto-electric sensor system, can be arranged in the card reading device within the vicinity of the surface of the card to verify material properties of the card by discrete spectroscopy in particular.

Moreover, an additional sensor or sensor system can be arranged at the card-feeding-portion but particular at the retraction compartment for cards to be withheld, wherein that sensor can particularly be a light barrier that is connected with the at least one evaluator device and in particular comprises one or more opto-electric sensor elements to detect manipulations at the card-feeding-portion. In a preferred embodiment the card reading device can thus be arranged such that a further sensor system is arranged in the card-feeding-portion, wherein that sensor system is connected with the card reading device and comprises one or more sensor elements to detect manipulations at the card-feeding-portion. Also the sensor elements preferably are opto-electric elements of a light barrier but can be other components or sensor types to monitor the area.

The card reading device that usually comprises an intake compartment into which the card is inserted/fed can be configured to comprise at least one evaluator device with mechatronic transducers but in particular with piezo-electric transducers comprising sensors and/or actuators. The mechatronic transducers are arranged in the intake compartment to check/verify the integrity of the card reading device, but in particular of the housing and/or the intake compartment, wherein the evaluator device is arranged to receive a signal that has been excited from a portion of the mechatronic transducers and is detected by another portion of the mechatronic transducers to compare it with reference data, and to send out a warning signal at a defined deviation that stands for a lack of integrity of the card reading device. Therefore, mechatronic transducers can be arranged in or at the intake compartment, wherein said transducers can in particular be piezo-electric transducers, comprising sensors and/or actuators connected with the evaluator device. Said transducers are used to cause a vibration being applied to the card reading device, wherein the vibration is in the hearable sonic-range or eigenfrequency-range to check the integrity of the card reading device and in particular of the housing and/or the intake compartment. To this end the evaluator device manages reference data, e.g. reference data from a mechatronic transducer, that represents an acceptable condition of the intake compartment. The mechatronic transducers can also be arranged in a sensor patch or array. Herein, the sensor patch preferably comprises multiple sonic-electric and in particular piezo-electric sensor elements. Such a sensor patch can also be attached in the intake compartment of the card reading device but preferably parallel to a surface of the card to also check the material properties of the card. Herein, single components of the sensor patch can function as actuators but in particular piezo-electric actuators to excite a part of the card reading device or the card to vibrate, such that the other sensor elements of the sensor patch can generate the signals to be evaluated. Therefore, the evaluator device can be extended to not only evaluate signals coming from the opto-electric sensor patch but also signals coming from the other sensor elements in particular those from the mechatronic sensor arrangement.

DESCRIPTION OF THE FIGURES

In the following the present invention is described in accordance with embodiments and the attached figures which show the following representations.

DETAILED DESCRIPTION

Figure 1A:
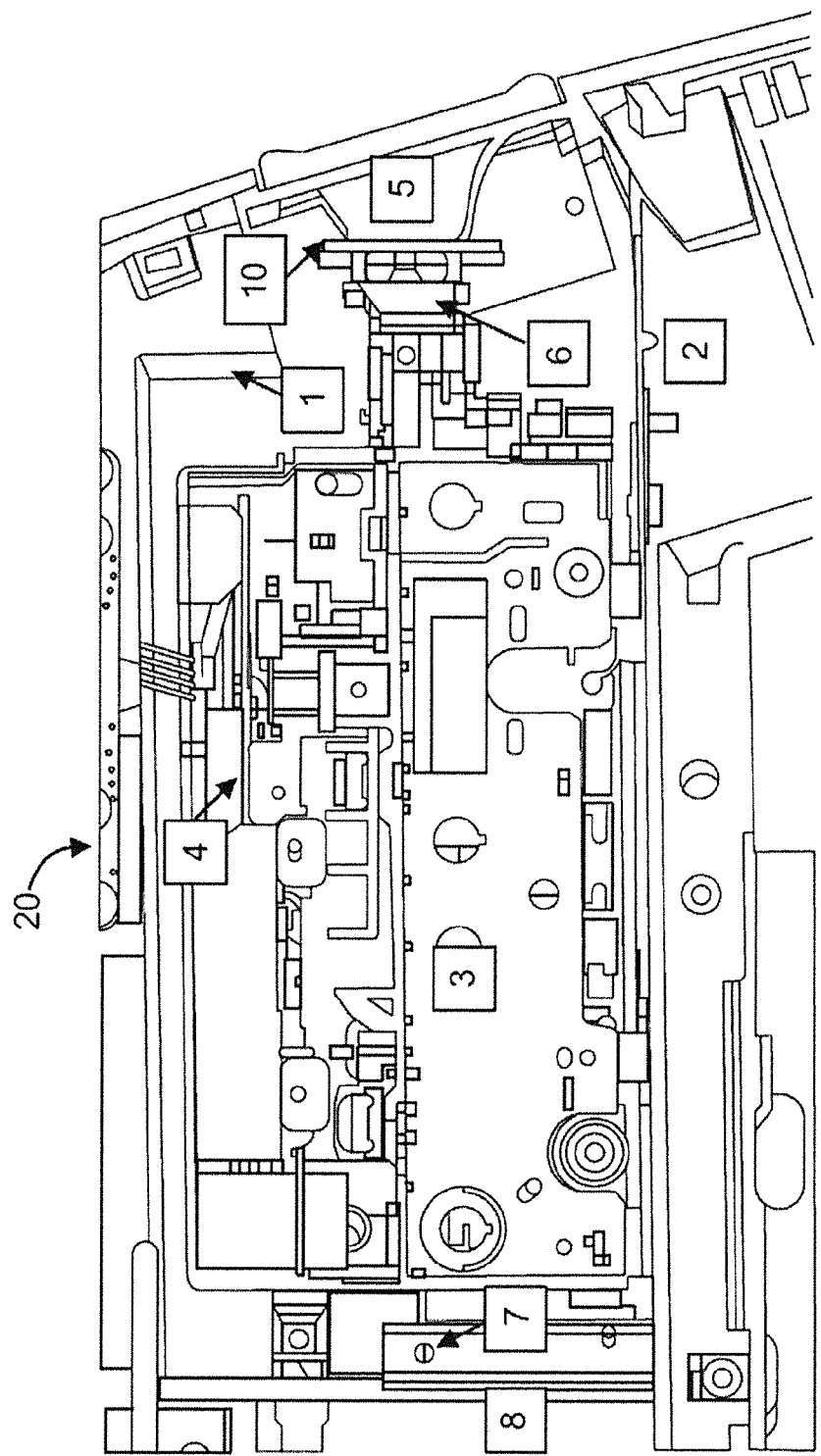
FIG. 1a shows a cross-sectional view of an installation of the card reading device.
Figure 1B:
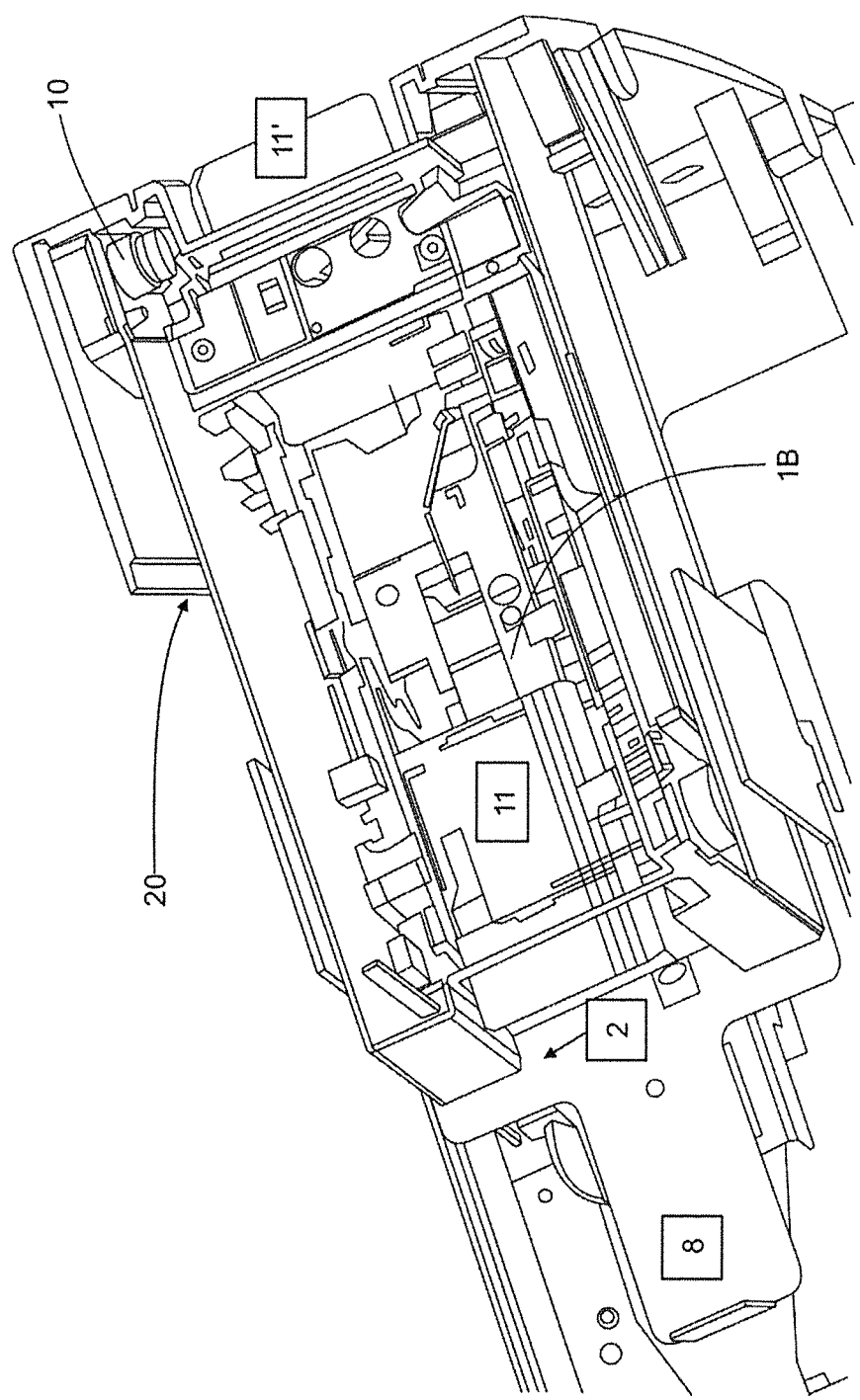
FIG. 1b shows a three dimensional view of the card reading device to be installed within a self-service terminal.

FIGS. 1a and 1b show a schematical view of the card reading device 20 comprising an intake compartment 13 for a card to be read. The intake compartment 13 also comprises the card reader or card reading elements as such, that for instance comprise a contact area/pad for reading card chips and a reading head/pick-up to read magnetic strips. The card 11 or 11' to be read is supplied to the intake compartment 13 via the inserting slot by conventional means to be optimally positioned with respect to the card reading elements for reading. For this purpose conventional guiding and supply elements can be used.

In the present invention "card reading device" refers to the device as a whole (cf. FIG. 1b) thus comprising the housing 1, a base plate 2, a card reader 3, in some cases a so-called IDKG-add-on 5, additional sensors 6, in particular light sensors or sensor arrangements, and optionally a camera 10, and card-supply/transportation means. Depending on the actual version it is also possible that the device comprises less components. The term "card reader" refers to the device 3 that is used for the actual reading of the card. The housing 1 circumferences the card reader 3 in connection with the base plate 2 completely. Preferably, the transducer elements (mechatronic transducers) are mounted at/in the housing 1; but basically a mounting at all other single components is possible, too. For this purpose it is useful to consider a superposition of the modal stretchings (functions of strain) in the frequency ranges to be considered. By doing so significant and therefore suitable positions can be visualized and a positioning can be done.

The sole openings of the housing are represented by the opening area for insertion of the card (IDKG-slot unit/module 5) comprising the detection (unit) including the sensors 6 and by the opening for retraction of cards being monitored by the light barrier 7.

As is shown in particular in FIG. 1b, the card reading device 20 comprises a retraction compartment 8 in its rear area that is intended for storing/withholding cards 11 which the self-service terminal, due to have not met specific conditions, cannot give back to the user. The compartment 8 which is referred to as retraction compartment is located at the end of the supply/transport chain, meaning even behind the intake compartment 13 in which the specific card is read. After reading or attempting to read the card 11, said card is transported further to the retraction compartment 8.

Figure 2:
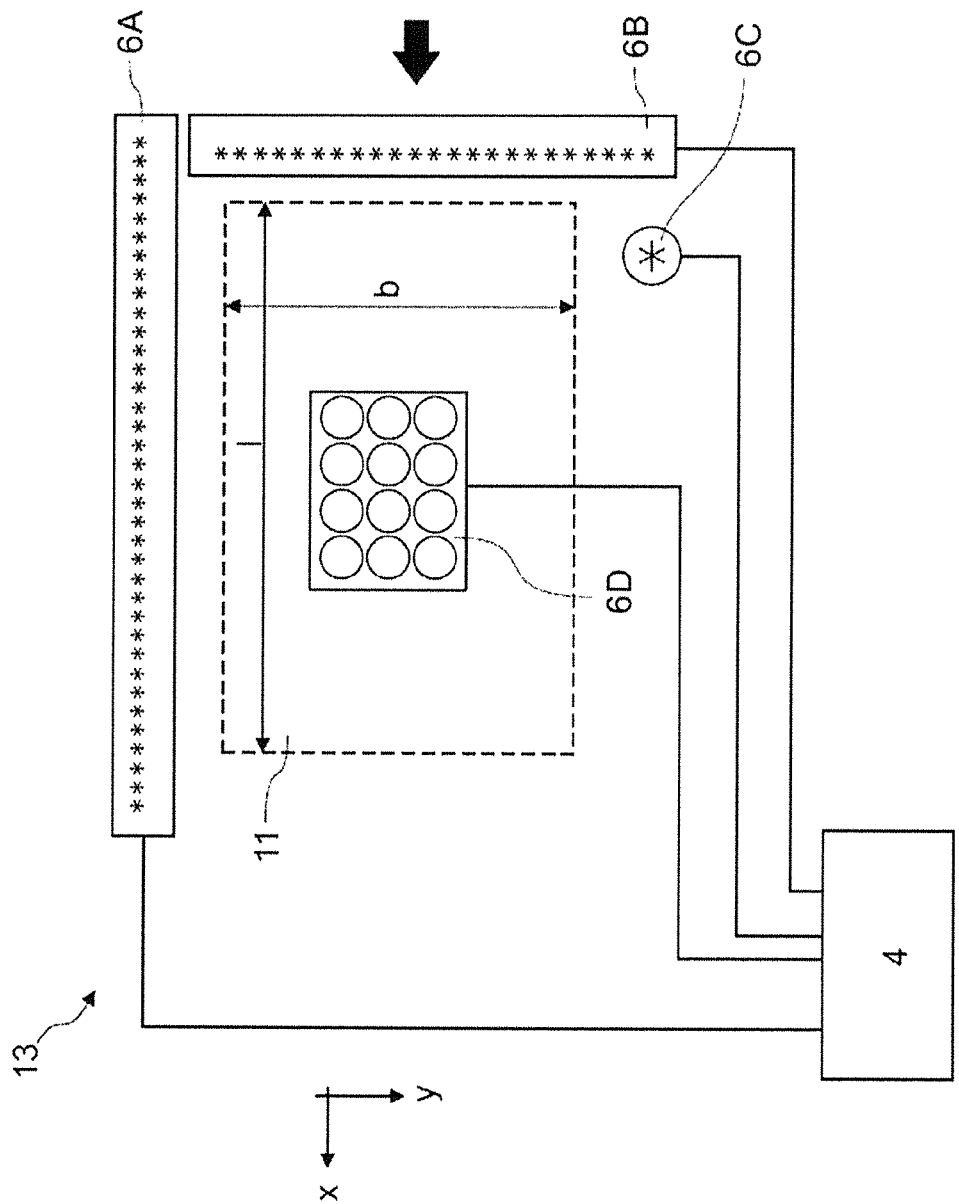
FIG. 2 shows a schematic view of an arrangement of sensor patches to verify the dimensions (length, width, height) of a card.

The card reading device 20 is equipped with a sensor system (cf FIG. 2) that is mounted to a sensor carrier (cf FIG. 1A) and can exactly detect and check the spatial dimensions (length, width and optionally height) of the inserted card 11.

Optionally a material determination via discrete spectroscopy in the IR-range can be performed by means of the sensor system.

The sensor system is arranged such that at least one dimension can be captured/detected that is preferably the width b or the length l or optionally the height h of the card. The sensor system 6B measures the width b of the card but can also be used to measure the length l of the card, e.g. by a temporally triggered capturing by the sensor 6B, wherein the length of the card is determined via the intake velocity/intake time. Moreover, single sensors can be used for each dimension. Said sensors can particularly be sensor arrangements such as opto-electric sensor arrays or strips of the type TSL208R that are fabricated by the company TAOS and comprise a number of 512 photodiodes linearly arranged in a distance of 125 µm. Herewith a very precise measurement can be achieved. Furthermore, an additional sensor 6C can be arranged within the card reader or the intake compartment 13 to measure or check the height of the card (in z-direction). Depending on the specific case it can be sufficient to measure only one or two dimensions that are preferably the length and/or the width.

By means of the integrated sensor systems 6A, 6B and/or 6C (optional) as well as by means of the light barrier 7 in combination with connection with the signal to retract coming from the card reader 3 the slots of the housing can be secured. Additionally an installed camera 10 (cf FIG. 1b) can be used. The functional connections are explained according to the FIGS. 4a-c.

Figure 4A:
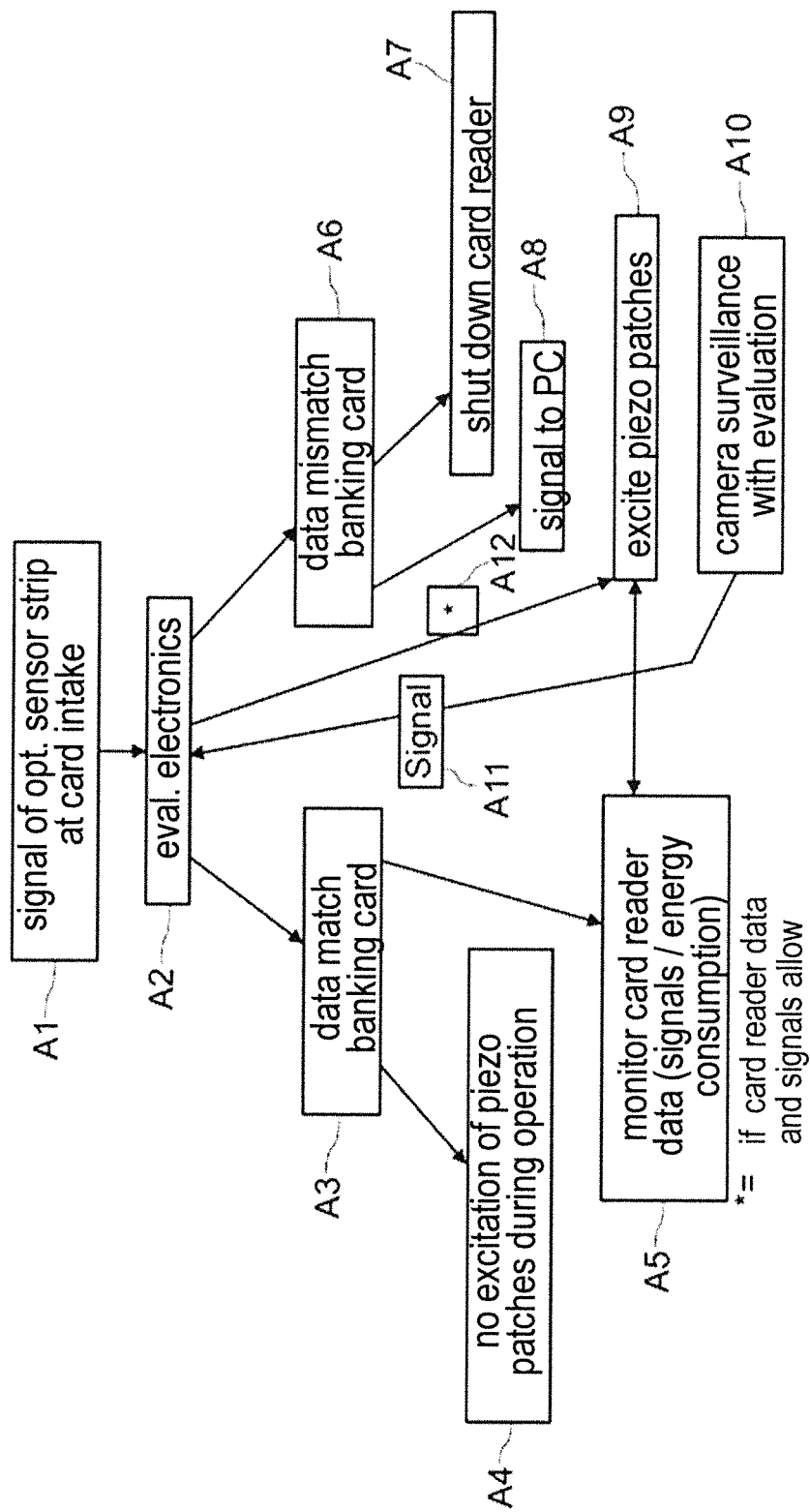
FIGS. 4a-c show logical connections between the steps of the method; a=inserting the card, b=retracting the card, c=checking/verifying the housing integrity.

First of all it is referred to the FIG. 4a that shows the verification of the inserted card 11, wherein said verification/check is executed with the opto-electric sensor arrangement. In FIG. 4a there are functional blocks A1-A12 that represent the following:

A1: The opto-electric sensor elements provide/generate measurement signals for a width b, a length l and optionally for the height of the card 11.

A2: The evaluator device/electronics 4 checks/verifies the measured data/values comparing said values with standardized values of normalized banking cards.

A3: If the measured values match/correlate to the standardized values the banking card is supposed to be a normal one.

A4: Exciting via the piezo-electric sensor arrangement field 6D is preferably not done during operation of the card reader.

A5: However, monitoring of the card readers is executed, in particular of the card reader signals and/or energy consumption of the card reader.

A6: If the measured data, as determined in A2, do not correlate to the standardized values, this indicates that an manipulation attempt has occurred.

A7: Shutting down the card reader, and retracting the manipulated card if possible.

A8: The software control of the delf-service terminal, which can be a PC, provides a warning signal.

A9: An excitation can be executed at determined times of operation to verify the integrity of the housing.

A10: An optional camera surveillance (cf 10 in FIG. 1a) can generate signals (images, video and/or audio).

A11: The camera-signals are sent to the evaluator device 19 or to the computer in order to document the manipulation attempt and to store images of suspicious individuals for a subsequent identification.

A12: Optional step wherein it is indicated/signaled that block/step A9 is executed if this is allowed by the card reader data/signals.

Figure 4B:
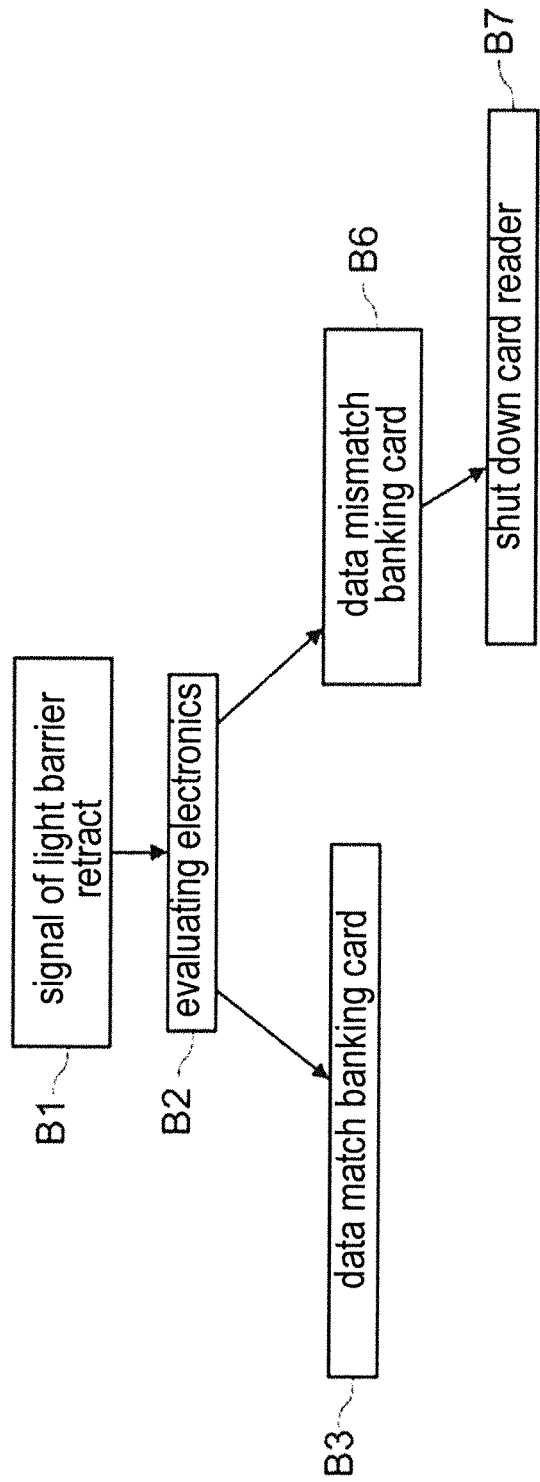

FIG. 4b is about monitoring the retract compartment via the sensor system or light barrier 7 (cf FIG. 1a) installed therein. In FIG. 4b there are functional blocks A1-A12 that display the following:

B1: The opto-electric sensor system or light barrier 7 at the retract slot creates signals, if a card 11, a fake card or another object is transported through this slot or if an alien object is attempted to be inserted trought the compartment 8 from behind.

B2: The evaluator device compares the result to the status of the card reader, meaning that the result is 'okay' if there is a retract situation. All other results are considered to be manipulation attempts.

B3: Depending on the signals and measuring values it is determined that a normal card has been transported/supplied trough the retract slot 7 or that a normal retract process has happened.

B6: If the transport of an abnormal card trough the retract slot 7 or the absence of a normal retract procedure has been determined in block/step B2, this indicates that there is a manipulation attempt.

B7: The card reader is the shut down/switched off.

Figure 4C:
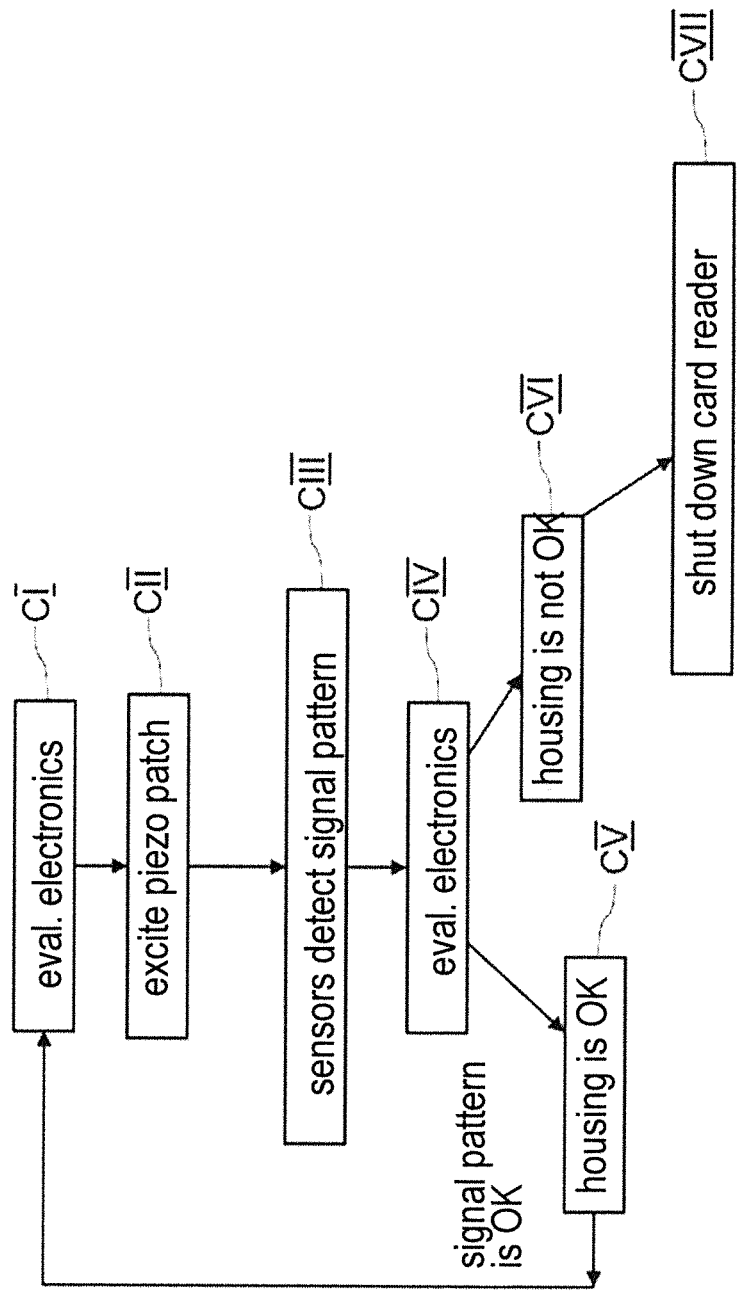

FIG. 4c refers to a verification of the integrity of the card reading unit. The functional principle shown in blocks/steps CI-CVII however refers to a material-check of the self-service terminal housing to determine if it has been manipulated. FIG. 4c refers to the verification of the housing (cf 1 in FIG. 1b):

CI: The evaluator device 4 triggers the verification/check of the housing by exciting piezo-electric actuators that are mounted at the housing to vibrate and by evaluating the measured values coming from same wise mounted sensor arrangements. The actuators can be integrated within the sensor arrangements (comparable to 6D in FIG. 1b) or can be single piezo-electric elements of a certain field/area that are controlled to vibrate.

CII: First of all the piezo-electric actuators are excited at known frequencies by a sweep.

CIII: The sensors capture the signals.

CIV: The evaluator device evaluates via the described method.

CV: If the integrity of the housing is verified, the cycle starts from CI.

CVI: If the integrity of the housing is not verified, the card reader will be switched off.

CVII: The card reader will be switched off; where required even the whole self-service terminal.

The verification of the housing can also be a part of the disclosed method or can be an independent solution. If it is an independent solution, there are mechatronic transducers installed at or in the card reading device, in particular piezo-electric transducers, comprising sensors and/or actuators connected to the evaluator device. These transducers serve to generate a vibration that preferably lies in the audible range of eigenfrequency range on the card reading device but in particular on the housing. The mechatronic transducers are arranged in such a way in, on or at the card reading device that the integrity of the card reading device can be checked/verified. The evaluator device is arranged to receive a signal from the mechatronic transducers that has been excited by a part of the mechatronic transducers and is detected by another part of the mechatronic transducers to be compared with reference data and to output a warning signal, if a defined deviation is present implying a loss of integrity of the card reading device.

In the following the verification of the card material via the piezo-electric or optical sensor arrangement 6D (cf FIG. 2) that is installed in the card reader is described in detail. This solution can also be embodied/executed as an independent solution, but is described as a part of the disclosed method in the present description according to FIG. 2 and FIGS. 5-9:

To verify the integrity of the housing 1 of the card reading device, the card material and/or the intake compartment for the card 11, the measurement signals coming from the sensor arrangements 6D are pre-processed in the evaluator device 4. This procedure is done in steps 121-128 and is explained according to the FIGS. 3 and 5:

At first, in step 121 the local extrema for a specific incoming signal (starting point E) are determined, i.e. the absolute and relative maxima and minima of the amplitude from the signal waveform during the process. Then the upper and lower envelope is constructed in step 122, wherein said envelopes being the an upper curve/function connecting the maxima and an lower curve/function connecting the minima. Then, in step 123, an mean value of said envelope is formed, preferably as an arithmetic (or alternative) mean value. In a further step 124 a possible intrinsic modal-function (also known as IMF) is extracted. The steps 121-124 are executed in an iterative way, wherein in step 125 it is checked if and how severe the difference of two consecutive iteration-steps is. Therefore, the intensity of the deviation of two IMFs is checked.

If said difference/deviation is larger that a certain threshold, the next iteration step is performed (steps 121-124). Otherwise the latest determined IMF is used (step 126). Furthermore, the residuum is extracted in step 127 and is consecutively compared to a threshold in step 128. If said residuum is larger than the threshold, a further iterative step is performed (steps 121-124). Otherwise the procedure is stopped (end point A="stop"). In this case the IMF us used which was found suitable in step 126.

Figure 3:
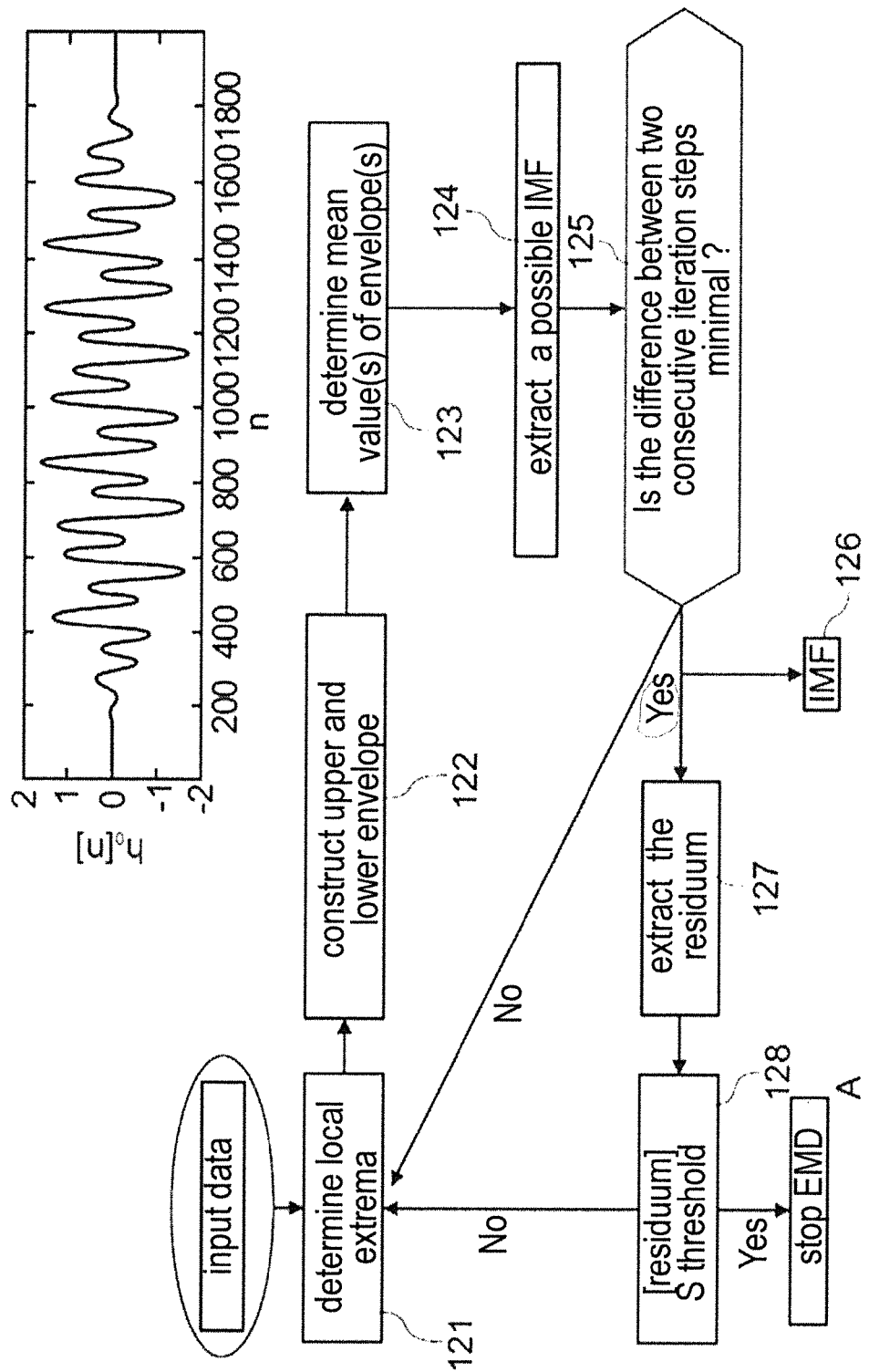
FIGS. 3,5 show diagrams of a signal pre-evaluation that are executed in the method.
Figure 5:
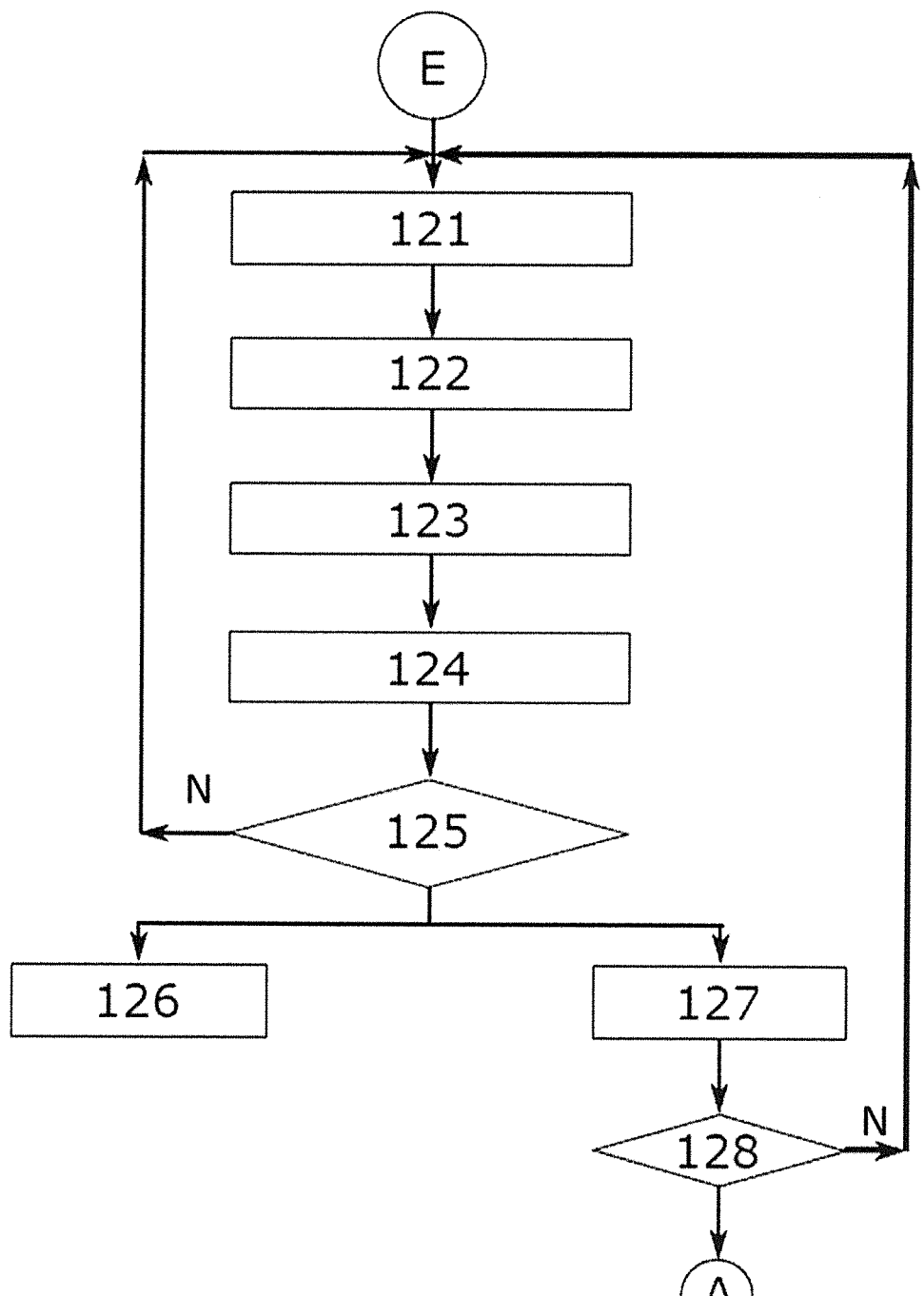

The process displayed in FIGS. 3 and 5 displays an empirical mode decomposition (EMD) with which the piezo-electrical sensor signals can be processed to accordingly obtain one or more suitable IMFs being particularly characteristic for the material-properties of the investigated card. The executed EMD correlates to an iterative filtering process or smoothing process, wherein the highest frequency components can be extracted in each step. Thereby superpositions at high frequencies can be eliminated and amplitudes can be effectively smoothed. By using the EMD characteristic features can be yielded in a multidimensional feature space thus allowing an effective and reliable classification.

The data of the IMF as comprised in the process 120 can be subject to further steps including a classification that allows a solid decision of whether a manipulated card or even an alien body has been inserted into the card reader or not.

First of all it must be noted that the following has to be considered while using the features represented by the IMF:

Features are used to differentiate certain states.

Features should be derived from possible object features.

Figure 6A:
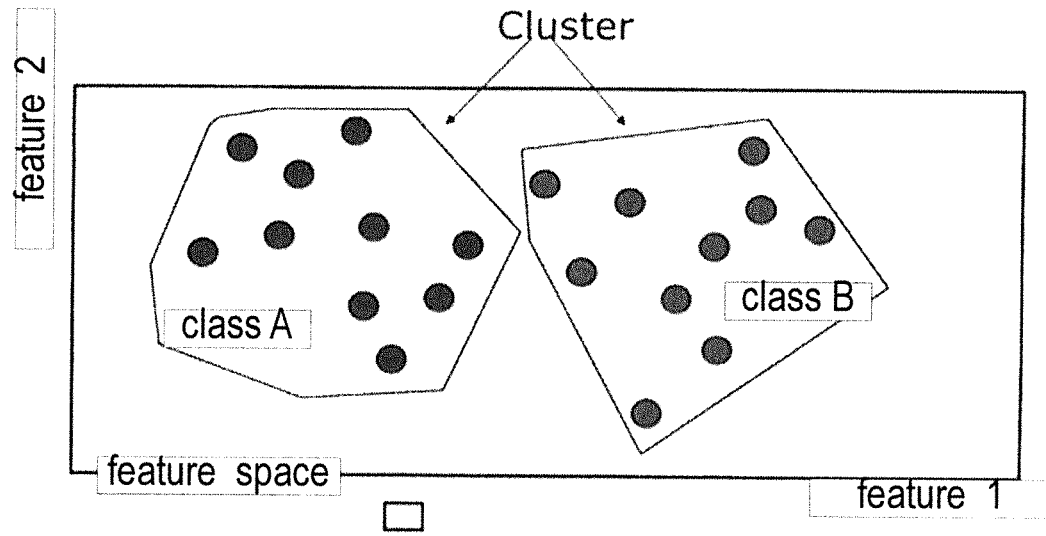
FIGS. 6a&b show a content extraction and classification obtained with the method.
Figure 6B:
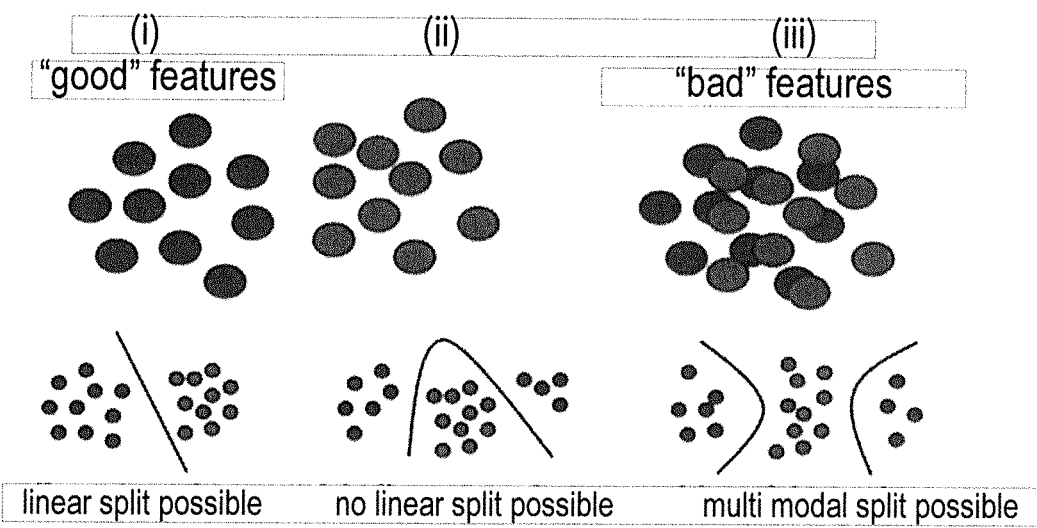

Features shall be different from one another (cf FIG. 6b case (i) and (iii)).

Objects of the same class should be found at similar locations in the feature space (cf cluster points such as shown in FIG. 6s).

The lesser the number of features needed, the more effective the decision can be made.

Generating good features shall be done specifically for each use case.

The yielded IMFs do basically represent a statistic pool of features (cf FIG. 9) that is particularly characterized by the following parameters of each of the specific IMF, namely by the standard deviation σ, the loop C, the excess E, the average deviation from the Median MD as well as the Median MAD of the total deviation. These data (amongst others) are particularly useful for a classification using a modified fuzzy-pattern classifier (MFPC) that is described according to FIGS. 7-9:

It must be noted first, that IMF as yielded from the signal pre-processing (step 120 in FIG. 5) can optionally be subject to segmentation and to a subsequent feature extraction. However, these steps of the method are not explained in detail since the key aspect of the present application lies in the classification.

For classification a classification unit KFE (cf FIG. 7) is used that treats the data DAT (here the data of the specific IMF) as obtained according to a classificator KF as verification data PDAT and compares said data to a pattern mapping MZ. The classificator KF is not static therein but can be learned or optimized via a learning unit LE. This is done by treating the data DAT as training data TDAT and by comparing it to a pattern mapping MZ. The optimized classification KF is then employed to the real measured data (PDAT).

Figure 7:
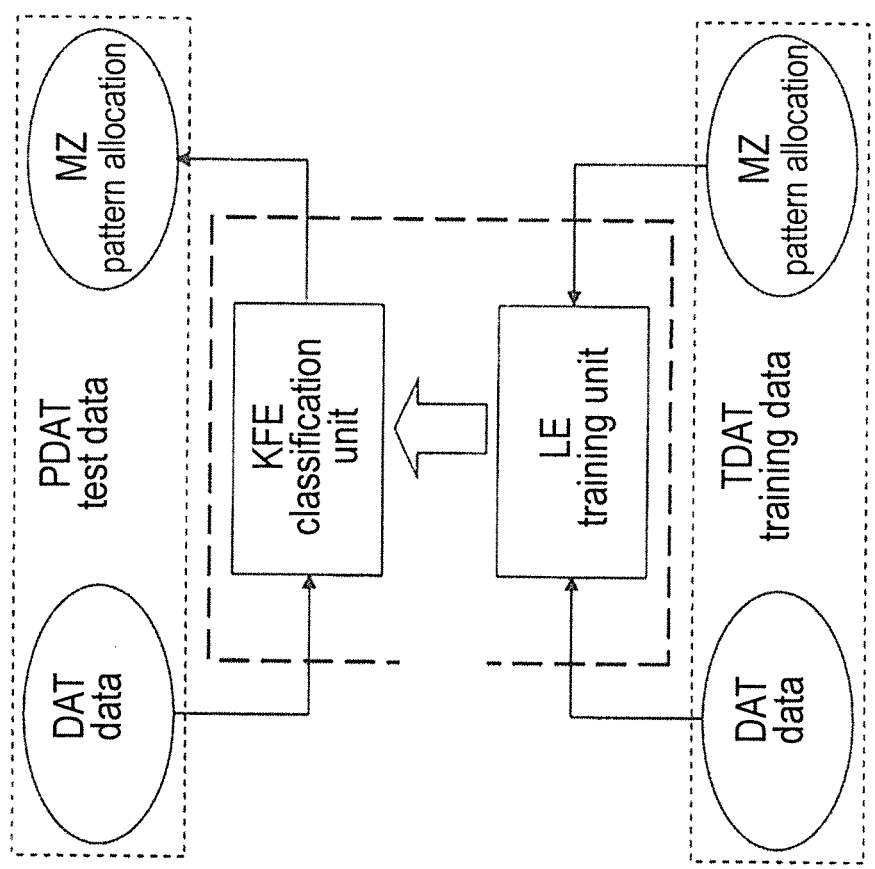
FIG. 7 shows a schematic view demonstrating the function of a classificator able to learn.
Figure 8:
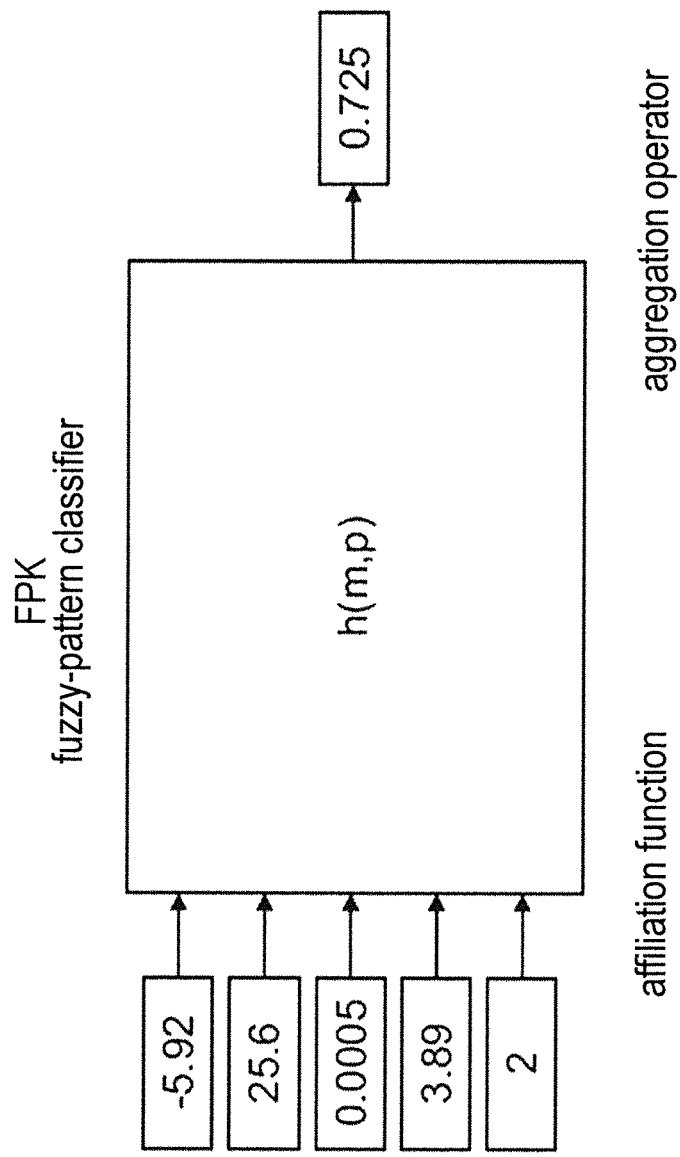
FIG. 8 shows the function of a fuzzy-pattern classificatory.

As shown in FIG. 8 the classifier is conditioned/defined as a fuzzy-pattern-classificator (FPK) to allow a fuzzy-pattern-classification. Such a classification describes a problem associated evaluation and assignment of data in the context of being gradually associated (association function μ(x)) and being coupled amongst each other according to measuring values (aggregation). By expertise and training (see FIG. 7) association functions can be generated according to measurements. The fuzzy-pattern-classification takes into account the uncertainty of the classes being generated from single observations and employs the concept of association functions. The association function $\mu KL: X \rightarrow [0,1]$ correlates every object x of the feature space X to a number from the real valued interval [0,1], wherein this number designates the degree of belonging $\mu KL(x)$ of the object to the un-sharp class KL. Furthermore, an uncertainty of every sole observation or every object due to methodological problems, measurement errors and so on is assumed. This uncertainty is expressed by designating an basic uncertainty to every object. For further details it referred to the literature.

Figure 9:
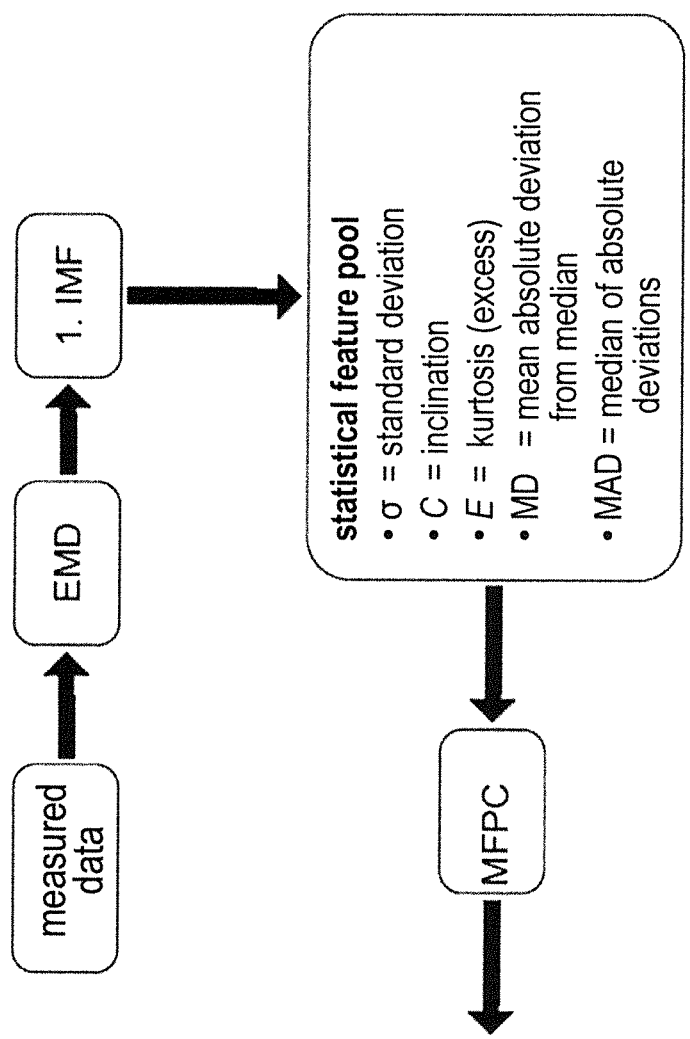
FIG. 9 shows the process of an exemplatory method.

The input for the fuzzy-pattern-classification, as displayed in FIG. 7, are statistical features as displayed in FIG. 9.

The extracted features comprise for instance the standard deviation, skewness, kurtosis average deviation from the median and the median of the absolute deviation. The standard deviation is a measure for the shattering of the values of a random variable around its expectation value. The skewness is a statistical characteristic number describing the type and strength of the probability distribution. It designates how strong the distribution tends to the right (positive skewness) or to the left (negative skewness). The kurtosis is a measure for the peakedness vs. tailness of a (single maximum) probability distribution, statistical density distribution or frequency distribution. The kurtosis is the central moment of order four. Distributions with a small kurtosis are distributed relatively uniformly; distributions with a higher kurtosis correspond to events that are distributed more extreme but for less events.

The median or also called central value is a mean value of distributions in statistics. The median of a list of numbers is the value that stands in the middle of said list after sorting the numbers in said list according to their value. The mean absolute deviation from the median is the variation/spreading around the median. Spreading/scattering (also called dispersion or average absolute deviation) combines various characteristic numbers in descriptive statistics and stochastics that describe the scattering widths of values of a frequency distribution or probability distribution around a suitable location parameter. The described calculation methods differ in being affected or being sensitive against runaway values. The scattering of the frequency distribution is called the standard error.

For the determination of the class the method uses a special procedure of supervised learning from structured, fuzzy example objects, i.e. objects that are defined to belong to a class by a "teacher" or "expert". Both the elementary fuzziness of objects and the fuzziness of the classes is expressed by the asymmetric potential-function according to Aizerman.

Summarizing and by considering all FIGS. 1-9 the following can be said to the implementation of the method in a self-service terminal:

Besides the installation of the opto-electric sensors for verifying the card dimension (sensor array 6A and 6B as well as 6C in FIG. 1a) and the opto-electric and/or piezo-electric sensor arrangement 6D for checking the card material and/or the condition of the intake compartment, the housing 1 of the self-service terminal (see FIG. 1b) can also comprise piezo-electric patches monitoring the manipulations at the housing itself. The housing can be made out of steel and/or plastic. It forms a base plate 2 and IDKG-module 5 enclosed in the housing. The only openings are the card slots for card intake and card retract (region 8). The piezo-electric are attached adherently in the preferred version, but can alternatively also be directly be formed in a plastic part. The sensors are operated by the evaluator electronic or evaluator device 4. The sensors can be operated as actuators or sensors. To this end the evaluator device 4 excites one of the sensors in an actuator fashion in a pre-defined pattern and the other piezo-electric patches obtain the excited signal. The electronics then compares the signal to a theoretical signal.

Furthermore the Computer of the self-service terminal (e.g. an ATM) is physically connected to the electronics. The electronics powers the card reader and is also optionally connected to the electronics in a logical way. The first (meaning the physical connection) serves a defined switching on and off of the card reader, the latter (meaning the logical connection) is used for processing possible firmware-signals of the card-reader, such as a retract or intake of the card. If the signal output of the card reader does not yet have firmware implemented, the energy intake of the card reader can be measured thus giving a reasoning for the modus of operation (intake/retract/output(stand-by) of the card reader.

The retract area (see FIG. 1b) guides and centers the card 11 to the card reader 3. It is equipped with said opto-electric sensor system being a sensor and light barriers that obtain the geometrical dimensions of the card completely. By means of at least one sensor arrangement, e.g. 6B in FIG. 2 it can be distinguished between a regular valid card and a non valid object, e.g. being a device for installing a skimmer in the interior of the device. The signals of the sensor arrangements 6A and/or 6B as well as the additional sensor 6C are evaluated in the evaluator device 4. The same is valid for the light barrier at the retract acompartment. However, in this case the light barrier 7 is not qualitatively evaluated but a fusion of information with the event "retract" of the card reader. Furthermore, the evaluator device 4 can send signals to the computer that activates a the optional surveillance camera 10 by a software (e.g. OSG) and checks the integrity of the card reader slot.

LIST OF REFERENCE SIGNS

20 card reading device
1 housing
2 base plate
3 card reader
4 evaluator device
5 IDKG slot module
6 sensors
7 light barrier
8 retraction compartment
10 camera(s) (optional)
11 card (EC/Master/Visa) inserted
11' card (EC/Master/Visa) in an insert slot
13 intake compartment
6A, 6B 6B linearly extending sensor arrangement;
6C additional sensor system
6D sensor array with piezo-electric sensor elements
121-128 steps for signal pre-processing
A1-A12; B1-B7; CI-CVII functional blocks

The invention claimed is:

1. A card reading device (20) for a self-service terminal, wherein the device being configured for inserting a card (11, 11') with stored data to be read, the card (11, 11') having a length (l) extending along an inserting direction of the card (11, 11') into the card reading device, a width (b) and a height, the width (b) and the height extending transverse to the length (l) and the width (b) being greater than the height, and wherein the self-service terminal comprises at least one sensor system (6A, 6B) and an associated evaluator device (4), wherein the at least one sensor system is arranged in the card reading device (20) and comprises at least one linearly extending sensor arrangement (6A, 6B), wherein the evaluator device (4) verifies at least one spatial dimension (l, b) of the card (11) selected from the length (l) and the width (b) by means of the at least one sensor system (6A, 6B).

2. The card reading device (20) of claim 1, wherein the at least one sensor arrangement (6A, 6B) is configured as a sensor strip comprising a plurality of linearly arranged sensor elements, and wherein the sensor strip extends in at least one of a longitudinal direction (X) parallel to the length (l) of the inserted card (11) and a transverse direction (Y) parallel to the width (b) of the inserted card (11').

3. The card reading device (20) of claim 2, wherein the at least one sensor arrangement (6A, 6B) that is configured as a sensor strip includes a first sensor strip (6A) that detects the length (l) of the card (11') as a first spatial dimension and/or a second sensor strip (6B) that detects the width (b) of the card (11') as a second spatial dimension.

4. The card reading device (20) of claim 3, wherein the second sensor strip (6B) detects both the width (b) of the card (11') and the length (l) of the card (11'), and wherein the second sensor strip (6B) detects a beginning and an end of the card (11') while the card (11') is inserted and wherein the evaluator device (4) determines the length (l) of the card (11') by measuring a time of insertion at a predetermined insertion velocity.

5. The card reading device (20) of claim 3, further comprising a first additional sensor (6C) detecting the height of the card (11') as a third dimension.

6. The card reading device (20) of claim 2, wherein the sensor elements of at least one of the sensor arrangements (6A, 6B) and/or the first additional sensor (6C) are opto-electric sensor elements.

7. The card reading device (20) of claim 2, further comprising a material properties sensor arrangement (6D) arranged in a vicinity of a surface of the card (11') to verify material properties of the card (11').

8. The card reading device (20) of claim 1, further comprising a retraction compartment (8) for cards (11) to be retracted, and a second additional sensor (7) connected with the evaluator device (4) and comprising one or more opto-electric sensor elements to detect manipulations of the retraction compartment (8).

9. The card reading device of claim 1, wherein the self-service terminal is an ATM.

10. A card reading device (20) for a self-service terminal, the device being configured for inserting a card (11, 11') with stored data to be read, the self-service terminal comprising at least one sensor system (6A, 6B) and an associated evaluator device (4), the at least one sensor system being arranged in the card reading device (20) and comprising at least one linearly extending sensor arrangement (6A, 6B), the evaluator device (4) being configured for verifying at least one spatial dimension (l, b) of the card (11) by means of the at least one sensor system (6A, 6B), wherein the card reading device (20) comprises a housing (1) and/or an intake compartment (13), into which the card (11) can be inserted, wherein the at least one evaluator device (4) is connected with mechatronic transducers comprising sensors and/or actuators, the mechatronic transducers being arranged in or at the housing (1) and/or the intake compartment (13) so that the integrity of the card reading device (20), the housing (1) and/or the intake compartment (13), can be verified/checked, and wherein the evaluator device (4) is adapted to receive a signal from the mechatronic transducers, wherein said signal is excited from one portion of the mechatronic transducers and detected by another portion of the mechatronic transducers to compare said signal with a reference data, and to output a warning signal at a defined deviation representing a lack of integrity of the card reading device.

11. The card reading device of claim 10, wherein the at least one sensor arrangement (6A, 6B) is configured as a sensor strip comprising a plurality of linearly arranged sensor elements, and wherein the sensor strip extends in a longitudinal direction (X) or a transverse direction (Y) of the inserted card (11').

12. A method for monitoring a self-service terminal, comprising:
   inserting a card (11, 11') containing data to be read into a card reading device (20) of the self-service terminal and into proximity to at least one sensor (6A, 6B) that has at least one linearly extending sensor arrangement (6A, 6B), the card reading device (20) having a housing (1) and/or an intake compartment (13) into which the card (11) can be inserted in order to be read; and
   using an evaluating device (4) that is connected to the at least one linearly extending sensor arrangement (6A, 6B) for verifying at least one spatial dimension (l, b) of the card (11) based on sensed information from the at least one sensor arrangement (6A, 6B), the card reading device further being equipped with mechatronic transducers comprising sensors and/or actuators in or at the housing that are connected with the evaluator device (4), and the method further comprising:
   transmitting signals from the mechatronic transducers to the evaluator device (4);

exciting said signal from one portion of the mechatronic transducers;
detecting the signal by another portion of the mechatronic transducers to compare with a reference data; and
outputting a warning signal at a defined deviation representing a lack of integrity of the card reading device.

* * * * *

UNITED STATES PATENT AND TRADEMARK OFFICE
CERTIFICATE OF CORRECTION

PATENT NO. : 9,773,385 B2
APPLICATION NO. : 15/258332
DATED : September 26, 2017
INVENTOR(S) : Dietz et al.

Page 1 of 1

It is certified that error appears in the above-identified patent and that said Letters Patent is hereby corrected as shown below:

On the Title Page

Item (12) "Dietz" should read -- Dietz, et al. --.

Item (72) Inventor is corrected to read:
-- Oliver Dietz, Borchen (DE);
Stefan Schmelter, Paderborn (DE);
Julian Fetting, Paderborn (DE);
Steffen Priesterjahn, Paderborn (DE);
Alexander Dicks, Herford (DE);
Uwe Moenks, Lemgo (DE) --.

Signed and Sealed this
Twentieth Day of August, 2019

Andrei Iancu
*Director of the United States Patent and Trademark Office*